(12) United States Patent
Osborn et al.

(10) Patent No.: US 8,463,805 B2
(45) Date of Patent: Jun. 11, 2013

(54) MAPPING PRODUCT IDENTIFICATION INFORMATION TO A PRODUCT

(75) Inventors: Kevin Jordan Osborn, Yucaipa, CA (US); Christophe Henri Edouard Laudon, Le Pradet (FR)

(73) Assignee: CBS Interactive, Inc., San Francisco, CA (US)

(*) Notice: Subject to any disclaimer, the term of this patent is extended or adjusted under 35 U.S.C. 154(b) by 95 days.

(21) Appl. No.: 13/072,394

(22) Filed: Mar. 25, 2011

(65) Prior Publication Data

US 2012/0066253 A1 Mar. 15, 2012

Related U.S. Application Data

(60) Provisional application No. 61/383,321, filed on Sep. 15, 2010.

(51) Int. Cl.
*G06F 7/00* (2006.01)
*G06F 17/30* (2006.01)

(52) U.S. Cl.
USPC .......... 707/765; 707/759; 707/758; 707/705; 707/706; 707/713; 707/722; 707/736; 707/780

(58) Field of Classification Search
None
See application file for complete search history.

(56) References Cited

U.S. PATENT DOCUMENTS

| | | | |
|---|---|---|---|
| 6,324,534 B1 | 11/2001 | Neal et al. | |
| 7,672,877 B1* | 3/2010 | Acton et al. | 705/26.1 |
| 2003/0195877 A1 | 10/2003 | Ford | |
| 2003/0233350 A1* | 12/2003 | Dedhia et al. | 707/3 |
| 2006/0218132 A1* | 9/2006 | Mukhin et al. | 707/4 |
| 2007/0078822 A1* | 4/2007 | Cucerzan et al. | 707/721 |

* cited by examiner

*Primary Examiner* — Fred I Ehichioya
*Assistant Examiner* — Jau-Shya Meng
(74) *Attorney, Agent, or Firm* — Mahamedi Paradice Kreisman LLP (57) ABSTRACT

Mapping product identification data to product information. Generating classifiers operative to classify products referred to in product identification data. Receiving client product identification data. Applying at least one generated classifier on the received product identification data. Using at least one classification determined by the applied classifier(s) and a subset of the client product identification data to query the product database. Qualifying the results of the query using at least one classification.

18 Claims, 5 Drawing Sheets

— 100

Notebook System — 110

PIII 700 MHz - RAM 128 MB - HDD 12 GB DVD - Savage/IX - Win2000
14.1" TFT 1024 x 768 Part #: 123456U — 120

130

— 140
This series of notebooks are the lightest high performance mobile computers. These trim and light notebooks are powered by a blazing processor, and a long-lasting battery, making them an ideal mobile computing solution for frequent travelers.

Product description   Notebook T43 2668 - Pentium M 700 1.86 GHz - 14.1" — 152
Dimensions (WxDxH)   12.2 in x 10 in x 1.2 in — 154
Weight               5.1 lbs — 156
System Type          Notebook — 158

MAPPING PRODUCT IDENTIFICATION INFORMATION TO A PRODUCT

CROSS REFERENCE TO RELATED APPLICATIONS

The present application claims the benefit of U.S. Provisional Patent Application No. 61/383,321, filed Sep. 15, 2010, and hereby incorporated herein by reference in its entirety.

FIELD OF THE TECHNOLOGY

The technology disclosed herein relates to mapping of product identification data to product information maintained in a database.

BRIEF DESCRIPTION OF THE DRAWINGS

FIG. 5 illustrates a graphical user interface for evaluating results of mapping of client product identification data to normalized product information.

DETAILED DESCRIPTION

Reference will now be made in detail to embodiments of the disclosed technology. Each embodiment described herein is provided by way of example, not as a limitation of the technology. It will become apparent to those skilled in the art that various combinations and permutations of features of the various embodiments can be created using the present disclosure. For instance, features described as part of one embodiment can be used on another embodiment to yield a still further embodiment. Thus, it is intended that the technology disclosed herein include such modifications and variations that come within the scope of the disclosure; and that only the claims serve to limit the technology.

Electronic commerce ("e-commerce") encompasses the buying and selling of products and services (referred to herein collectively as "products") over electronic systems such as the Internet and other computer networks. E-commerce typically uses the World Wide Web at least at some point in the transaction's lifecycle, although it can encompass a wider range of technologies such as e-mail as well. E-commerce sellers (e.g., original equipment manufacturers (OEMs), retailers, resellers, distributors) typically have a need for detailed product information (e.g., specifications, OEM marketing descriptions, product images) to support interactions with consumers such as product description, product search (parametric and free text), product comparison, product configuration, and identification/configuration of product accessories and related products.

With little or no standardization of product information format across the broad range of OEMs, retailers, and resellers, obtaining accurate information sufficient to support such consumer interactions can be resource-intensive.

Systems in which the technology disclosed herein can be useful include those that collect product information from multiple sources, normalize the collected product information in a standard format (e.g., for electronic product catalogs), store the normalized product information in a structured data repository such as the product information database, and provide an interface for clients such as e-commerce sellers, to obtain the stored normalized product information to support interactions such as those identified above, with consumers. CNET® Content Solutions Data Source™ product information service is an example of such a system.

Figure 1:
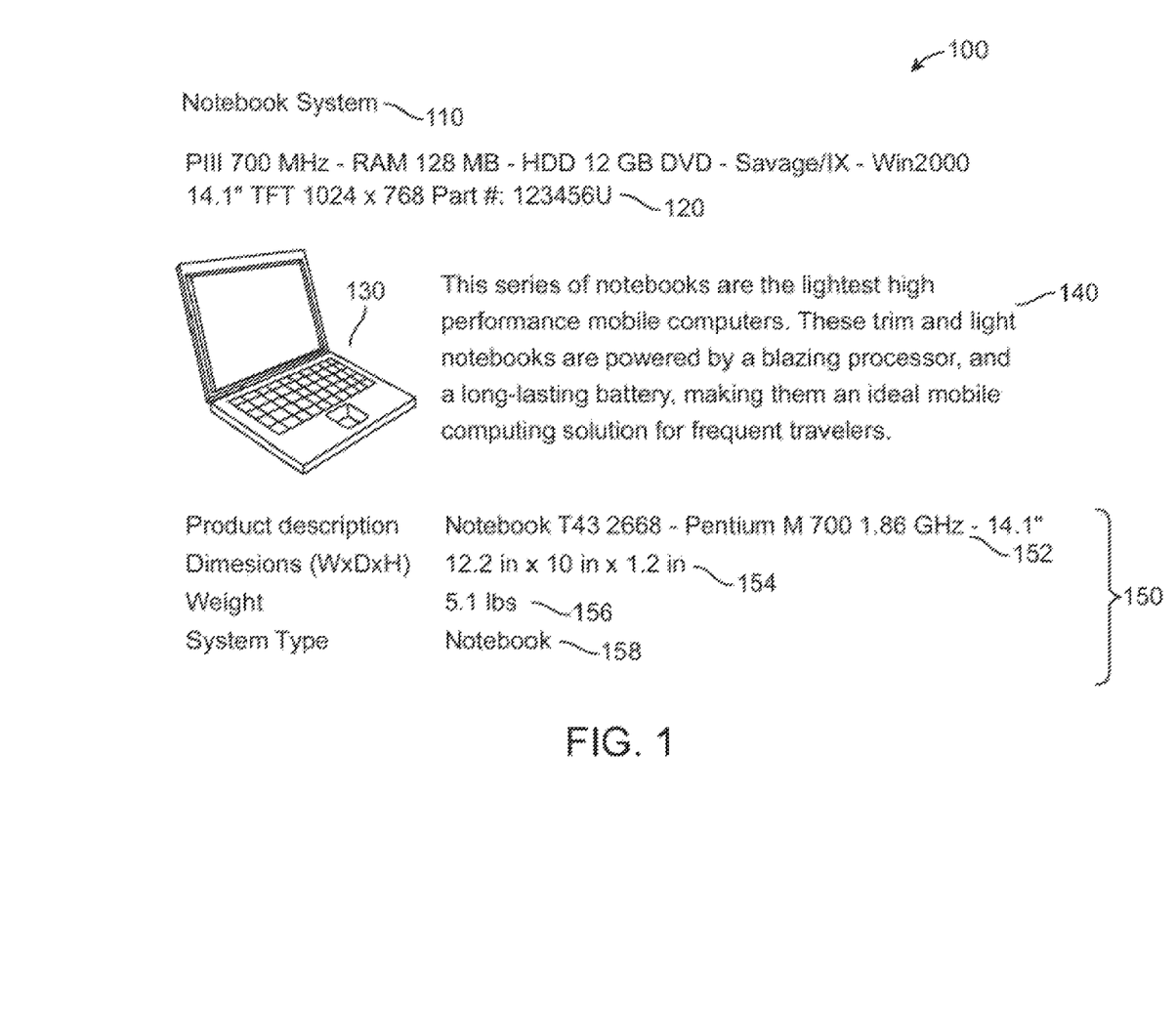
FIG. 1 illustrates normalized product information.

Referring to FIG. 1, an abstract example format 100 for a product datasheet containing normalized product information is shown. The example format includes: a title 110; a short description of key attributes using standardized terms for products of that particular category 120; a product image 130; a marketing description (typically from the product OEM) 140; and a main product specification 150 including a normalized product description 152; summary specifications 154, 156, and category 158 uniformly associated with such products.

Other information that can be included in the normalized product information includes: additional category information (e.g., where categories can be arranged in a hierarchy such as "systems>>laptops>>notebooks"); manufacturer, United Nations Standard Products and Services Code® (UNSPSC), and related OEM or third party product accessories. If the information for any particular field of the normalized product information is not available, the field can be left empty or an indicator such as "not available" or "not applicable" (as the case may be) can be used.

Typically, a client (e.g., an e-commerce seller) provides product identification data (e.g., product title, product OEM, product OEM part number) as input to such systems. As an initial task to providing normalized product information, client inputs can be mapped to appropriate entries in the stored normalized product information, e.g., the product information database, and indexes thereof.

Figure 2:
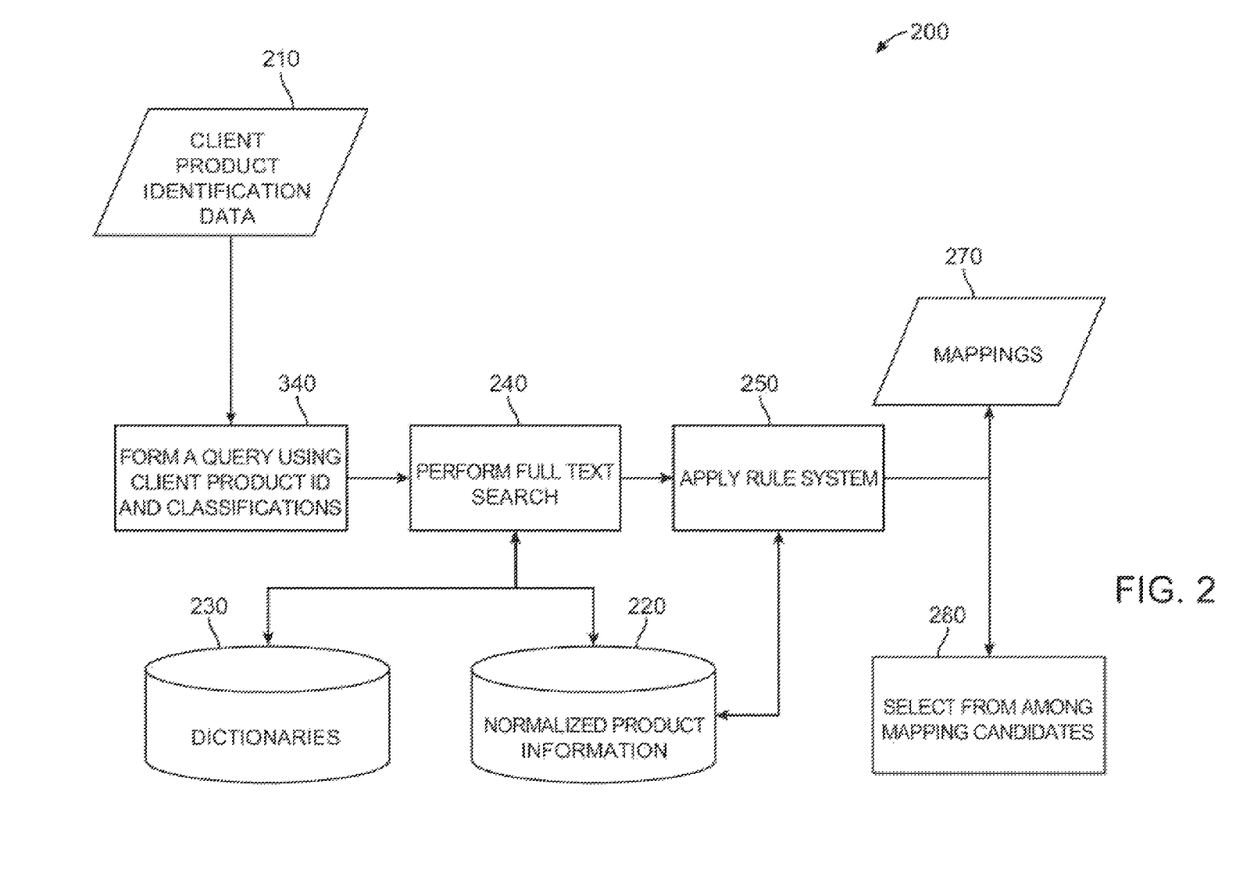
FIG. 2 illustrates aspects of mapping of client product identification data to normalized product information.

Referring to FIG. 2, an overview of a mapping process of the technology disclosed herein 200 is shown. Mapping can be performed using identifiers (Universal Product Code (UPC)/European Article Number (EAN), part-numbers) as well as any other data sent by the client 210 to derive the closest product information database match. A mapping product match can be the result of the intersection of the client's product identification data (manufacturer name, product title, part-number, UPC, category) 210 with the indexes of the product information database 220 or dictionaries 230 (e.g., relating product identification received from client(s) in the past with products covered in the product information database). The intersection can be determined using a full-text search engine 240.

The results of the intersection (potential mappings) can be provided to a rule system 250 that can determine a match qualification (e.g., perfect, good, average, poor) 260 for each potential mapping based factor such as on what information matched, how it matched, and where it matched. For example, the rule system 250 can determine that a mapping between client product identification data 210 and a potential mapping in the product information database is "perfect" if one or more of the following conditions are met.

A Universal Product Code (UPC)/European Article Number (EAN) found in the product information database is present in the client's request in a field tagged as "upc_ean." This is an "in-place" match because the UPC/EAN from the client's request was found "in place" in a UPC/EAN field in a product information database entry.

The manufacturer's name is present in the client's request in a field tagged "manufacturer;" the manufacturer's name is found in the product information database; a part number found in the database in the client request's product title (e.g., "Casio Exilim camera XYX-123"). This is an out-of-place perfect match since the product information database knows about a part number XYZ-123. Had the title contained "XYZ" instead, it would have been an out-of-place partial match.

Other conditions, some of which are described below, can be established for each match qualification. Specific match qualification definitions can be established for each client, thus expressing that client's policy with regard to the qualification of potential mappings. For example, if a client's specific conditions for qualification of a potential match is met in a single result, then that result can be committed as a mapping 270. Otherwise, a mapping can be selected from among results 280 by other means. Selection by other means can be made by a variety of methods, including by presenting the results (and qualification measures) to a client.

Often the product identification data provided by a client is incomplete, inaccurate, or both. Incomplete or inaccurate product identification data makes it difficult to map the product identification data in the client's request to product information in the database. Known solutions typically either rely heavily on human intervention to obtain a mapping, or reject the incomplete/inaccurate input without obtaining a mapping. The former can be resource-intensive. The latter is non-responsive to the e-commerce seller's needs. Technologies that increase the percentage of reliable mappings, or decrease the resources required to arrive at mappings are desirable.

Embodiments of the technology disclosed herein can further improve upon the process described above by: generating classifiers that can be used to focus the mapping process; receiving client product identification data; applying at least one generated classifier on the received product identification data; using at least one classification determined by the applied classifier(s) and a subset of the client product identification data to perform a full text search of an index of the product database; and qualifying the results of the search using at least one classification.

Document classification/categorization is a problem that can be addressed by information science. The task is to assign an electronic document to one or more classifications, based on the document's contents. Document classification techniques include: naive Bayes, term frequency—inverse document frequency (tf-idf), latent semantic indexing, support vector machines, artificial neural network, k-nearest neighbors (kNN), decision trees, concept mining, rough set, soft set, and other approaches based on natural language processing. Implementations of the technology disclosed herein can use document classification to improve the mapping between a product identifier, e.g., supplied by a client, and product information stored in the product information database.

Figure 3:
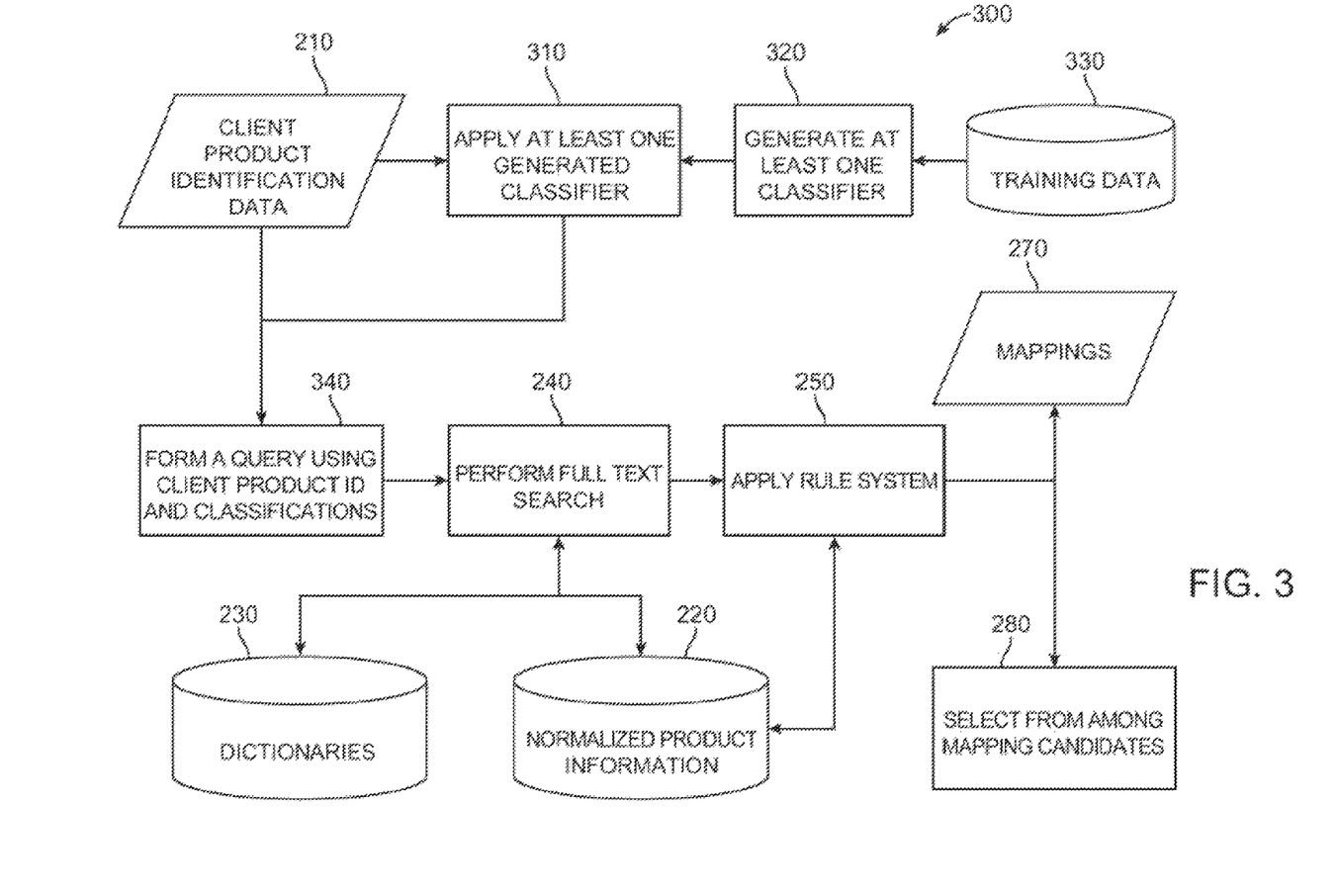
FIG. 3 illustrates aspects of mapping of client product identification data to normalized product information using classifiers.

Referring to FIG. 3, additional embodiments of the technology 300 are illustrated. These embodiments include the generation of classifiers 320 that can be used to determine the answers to various questions directed, at least in part, to the product in the client's product identification data 210. For example, certain classifiers can be directed to the nature of the product. Consider the following as examples of nature of the product questions. Is the product of a type covered in the product information database? Is the product an accessory? What category is the product?

Other classifiers can be directed to features of the product in the client's product identification data. Consider the following as examples of product feature questions. What is the processor speed of the product? Such product feature classifiers can be most effectively used after answering other questions about the product in the client's product identification data. If the output of a nature classifier indicates that the product is a laptop computer (e.g., a category), then a processor speed feature classifier can be appropriate. If the output of a nature classifier indicates that the product is a DVD (e.g., a category), then processor speed is not relevant.

Classifiers can be directed to relationships between the product in the client's product identification data and other products. Consider the following as examples of product relationship questions. With which products is the product of the client product identification data 210 compatible? Is the product of the client product identification data 210 an accessory of another product? Does the product of the client product identification data 210 come in multiple unit packages? Various software libraries are available for generating classifiers that can be used in the technology disclosed herein, including MAchine Learning for LanguagE Toolkit (MALLET), Classifier4J, Weka, and Apache Mahout.

Classifiers of the technology disclosed herein can be trained 320 based on labeled training examples 330. For example, TABLE 1 illustrates training examples that can be used to train a classifier that distinguishes at least between desktop computers (represented by label AA) and laptop computers (represented by label AB). Data for labeled training examples can be taken from the product information database, from an index thereof, from dictionaries (e.g., a compilation of known correct mappings based on historical inputs from a specific client), and from other sources of known correct mappings.

TABLE 1

| ID | Label | Data |
|----|-------|------|
| 1 | AA | Apple iMac 4.0 GHz 16 GB RAM |
| 2 | AB | Apple MacBook Pro 17" 2.7 GHz |
| 3 | AB | Apple MacBook Pro 15" 2.7 GHz |

Embodiments of the technology disclosed herein accept one or more product identifiers (e.g., from a client via a web form or from a tagged data file). TABLE 2 illustrates client product identification data 210.

TABLE 2

| Manufacturer Name | Description |
|-------------------|-------------|
| Lenovo | ThinkPad T61 15" 2.7 Ghz |

For each received client product identification data 210 record, at least one classifier can be applied 320. For example, applying the category classifier trained 320 by data 330 such as that of Table 1 to the product identification data of Table 2 would result in a determination that the category is "AB."

In embodiments of the technology illustrated by FIG. 3, the results of applying a classifier 310 to client product identification data 210 are used in combination with the client product identification data 210 to form a query 340 that can be addressed to a full text search engine 240. The full text search engine can search an index (e.g., an index of the product information database) that links descriptive information to product identifications used in the normalized product information database (e.g., the normalized product information database itself 230 or another database/index such as a dictionary 220 maintained at least in part for mapping).

As noted above, a rule system 250 can be used on the results for purposes such as ranking/assessing possible mapping candidates returned from the full text search 240. Where the confidence in a unique mapping at least meets a predetermined threshold, the mapping can be committed to a data store of mappings 270. Where multiple mapping candidates exist, approaches for selecting from among the multiple candidates 280 can be employed as described elsewhere herein.

Figure 4:
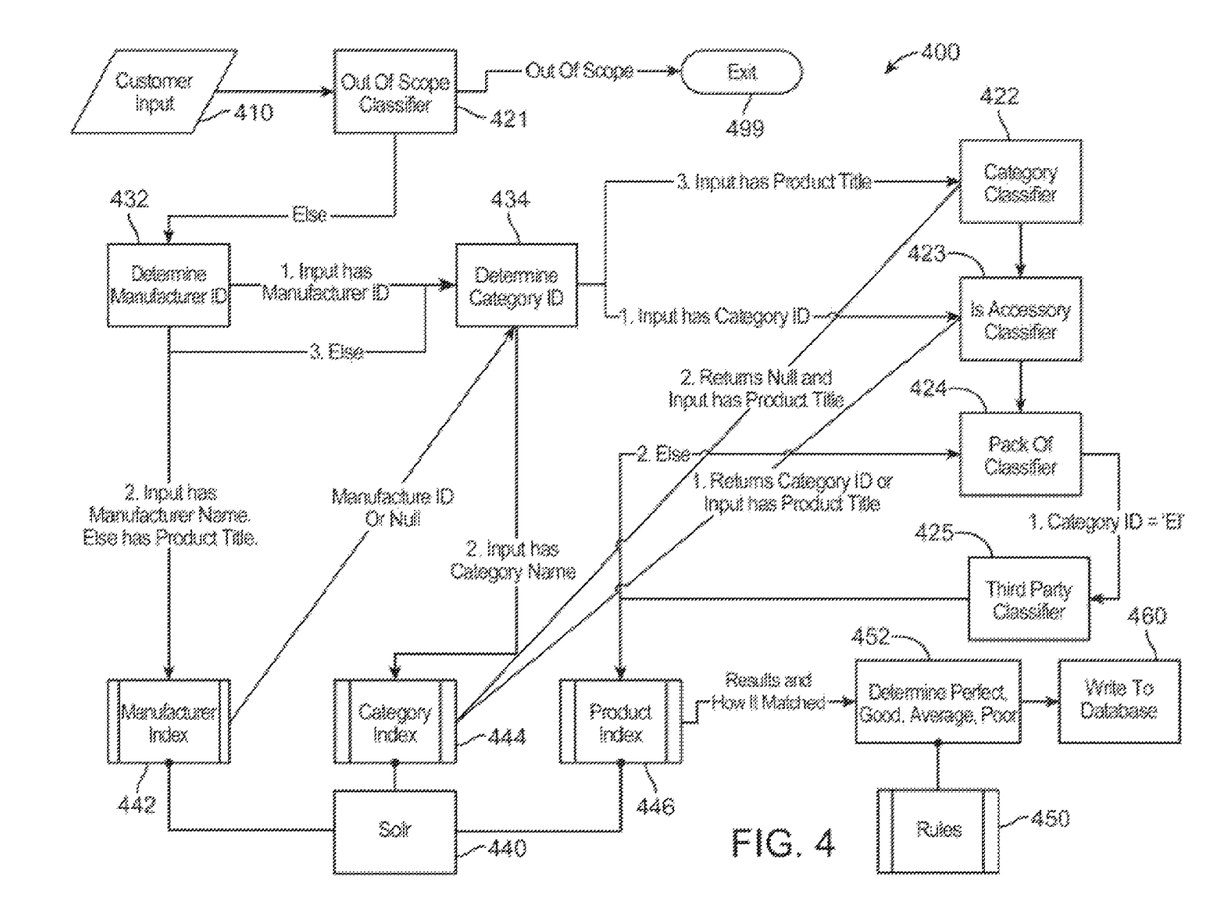
FIG. 4 illustrates aspects of mapping of client product identification data to normalized product information using classifiers.

Referring to FIG. 4, embodiments of the disclosed technology 400 that employ the principles illustrated in FIG. 2 and FIG. 3 are shown. In the fashion of embodiments described in conjunction with FIG. 2 and FIG. 3, the embodiments of FIG. 4 take customer input 410, for example in the form of client product identification data. These embodiments can employ classifiers 421, 422, 423, 424, and 425 at various stages; mine the customer input for explicit and implicit information on such things as manufacturer identity 432 and product category 434 through the use of product information database indexes 442, 444 via a search platform such as Solr 440 targeted to such information; search a product index 446 of the product information database with a query comprising the customer input 410 and information gained through applying the classifiers 422, 423, 424, and 425; qualify 452 the returned results based on rules such as 450; and commit the resultant mapping 460 when the mapping meets pre-determined qualification criteria, or present candidate mappings for selection/feedback (as shown in FIG. 5).

With regard to classifiers 421, 422, 423, 424, and 425, each classifier's output can be an array of predictions, and each prediction can include a label and a probability (L, P). In order to detect situations when a classifier's top prediction is uncertain, each classifier can undergo a post-training phase that qualifies the uncertainty zone that lies between the true-positives and false-positives using the ratio between the probabilities of the first highest probability and second highest probability labels as a basis. When the two top probabilities are relatively close, this can indicate that the classifier output may be ambiguous.

Each classifier can combine an unsupervised training step followed by the calculation of the uncertainty threshold. After training the classifier, a set of previously unseen labeled instances can be input to the trained classifier. Using the outputs, the technology can generate the mean of ratios between the two highest probabilities. For true-positives, TP_Ratio equals the sum(P1/P0)/N_TP; where P0 is the highest probability classifier output, P1 is the second highest probability classifier output, and N_TP is the number of true positive results. For false-positives, FP_Ratio equals the sum (P1/P0)/N_FP; where P0 and P1 are as described earlier, and N_FP is the number of false positives results.

When classifying, if P1/P0≧FP_Ratio, then the prediction can be deemed uncertain and can be returned as such to the calling application. A benefit of thresholding can be to reject as doubtful predictions for a large proportion of false-positives while decreasing the rejection of true-positives. In the following example of TABLE 3, 76% of false-positives (vs. 5% of true-positives) are rejected. This in turn raises the classifier's precision but lowers its ability to predict (recall).

TABLE 3

```
+- Classification results -----------------------------------------------
|   Instance nature : "Category"
|     Threshold mode : cross-label-mean
|           Speed : 15229 classifications/second
+- Before filtering -----------------------------------------------------
| Total records   : 77152
|    GoodPredictions : 77076
```

TABLE 3-continued

```
|         Kept : 73240
|         Thrown : 3836
|    BadPredictions : 76
|         Kept : 18
|         Thrown : 58
+- After filtering ------------------------------------------------------
|       Correct : 73240 (99.98% of usable, 99.90% of total)
|       Incorrect : 18 (.02% of usable, .10% of total)
|       NoAnswer : 3894 (4.80% of total)
+------------------------------------------------------------------------
| precision=99.98%, recall=95.26%, F1=97.56%
+------------------------------------------------------------------------
```

While the measure of classifier uncertainty has been described as a function of the two most probable (e.g., highest scoring) results returned by the classifier, other measures of uncertainty involving more than two of the results can be used. Consider training a classifier C2 using the outputs of classifier C1 and product feature predictions for the labels predicted by C1 as examples to yield a Boolean "trust" indicator. One rationale for this approach is that if a category prediction is correct then the predicted product features should follow patterns that can be confirmed by the C2 classifier.

For example, C1 Predicts "AA" as being the category (Desktop). C2 has been trained on the output of C1 but also on the predictions of features that the AA classifiers yield. The training data would take the form: Label="True", Data=AA, OutputOfAAC1, OutputOfAAC2 . . . Output of AACn; where AAC* are classifiers that return ProcessorSpeed, RAM Size, OperatingSystem, and the like.

As another example of other possible measures of uncertainty, consider training a SVM classifier using the correctness (True Positive or False Positive) of the C1 classifier as label and top "n" C1 probabilities as features to detect probability distributions that generally point at false-positives.

The embodiments illustrated in FIG. 4 use an OutOfScope classifier 421 at the beginning of the process. This classifier 421 can be executed if the customer input 410 contains a product title, and it returns the (label, probability) pair {("true", <probability that the product is out of scope of the product information database>), ("false", <probability that the product is NOT out of scope of the product information database>)} as a list in order of probability. If P0 is "true" and the FP_Ratio threshold is met or exceeded, then the conclusion can be that the product identified in the customer input 410 is out of scope of the product information database, and the process of 400 can be exited 499.

If the P0 from the OutofScope classifier 421 is "false," or if it is "true" with FP_Ratio threshold unmet, then embodiments of the technology can: 1) determine ManufacturerID 432 from a manufacturer index 442 of the product information database based on manufacturer name in the customer input 410; and 2) determine CategoryID 434 from a Category index 444 of the product information database based on category name in the customer input 410. Each index can be established and maintained by a search platform such as Solr 440 that can interface with the product information database, for example, for creation and maintenance of the indexes.

If the customer input 410 includes a product title, but no category, then a category classifier 422 can be applied. As described above, the category classifier can return an array of predictions. Each prediction can include a category label and a probability (<category label>, P). While the OutOfScope classifier 421 is described as returning only two (L, P) pairs— one pair for "true" and one pair for "false," the Category classifier 422 can return N pairs, where N is typically the number of categories covered by the product information database. The most probable M pairs, in the illustrated embodiments M=2, are used to form a confidence factor. If the FP_Ratio threshold is met or exceeded for a result, then the classified category can be used to modify the query to be sent to the product information database. The category classifier 422 can also be applied if no category is found after Determine CategoryID 434.

If the customer input 410 includes a category ID or a product title, or a category ID has been determined (e.g., by using the categoryID index 444), then an IsAccessory classifier 423 can be applied. As with the OutOfScope classifier 421, the IsAccessory classifier 423 can return two (L, P) pairs—one pair for "true" and one pair for "false." If the FP_Ratio threshold is met or exceeded for a result, then the IsAccessory can be used to modify the query to be sent to the product information database.

A PackOf classifier 424 can be applied to the customer input 410. As with the category classifier 422, the PackOf classifier 424 can return more than two (L, P) pairs—one pair for each answer to the question, "what size pack is the product offered in?" For example, labels for this classifier can represent package size, e.g., 2, 6, 12. If the FP_Ratio threshold is met or exceeded for a result, then the PackOf classifier results can be used to modify the query to be sent to the product information database.

If the category ID has been determined to be EI (printer consumables) or a product title, or a category ID has been determined (e.g., by using the categoryID index 444), then a ThirdParty classifier 425 can be applied. As with the OutOfScope classifier 421, the ThirdParty classifier 425 can return two (L, P) pairs—one pair for "true" and one pair for "false." If the FP_Ratio threshold is met or exceeded for a result, then the ThirdParty classifier 425 can be used to modify the query to be sent to the product information database. The ThirdParty classifier 425 is an example of a classifier that is specific to a subset of the products covered by the product information database. Other such classifiers can be created to cover subset-specific characteristics, especially those characteristics that can lead to an incorrect mapping.

A query composed of query data (e.g., customer input 410, classifiers), filter parameters and boosted parameters (e.g., from the various indexes and pre-processing rules) can be presented to a product index 446 via a search platform 440, for example, as a full text search as indicated in FIG. 2 and FIG. 3. Using those outputs of classifiers that meet or exceed the FP_Ratio to form the query can contribute to higher relevancy results being returned.

Referring to FIG. 5, a results display 500 from the full-text search for a plurality of customer input records, for example mapping requests 510, is illustrated. Each mapping request can be indicated by title identified in the request 511, the manufacturer name provided in the request 512, the manufacturer part number provided in the request 513, the product information database category provided in the request 514, the product ID (typically the requestor's product ID) provided in the request 515, the request ID 516 (e.g., relating a batch of product data to map), the date that the request was submitted 517, the current product covered by the product information database to which the request has been mapped 518, and a qualification measure (as discussed with regard to FIG. 2 above) of that mapping 519 of the most probable result returned by the full text search. Fields with no available data (e.g., "category" was not a field populated in the request for any of the displayed requests) can be left blank.

Request 520 is shown in FIG. 5 as selected by highlighting and having a "Good" outcome qualification for the most probable mapping. Selecting this request 520 causes the candidate mappings to be displayed in the lower portion 521 of the display 500. For each candidate mapping, the following (each as known to the product information database) are presented: the specific qualification measure for that candidate mapping 522, the title of the part 523, the manufacturer of the part titled in the previous field 524, the manufacturer's part number for the part 524, the part category 525, the UPC 527, applicable client markets 528, the score (a quantitative measure of the responsiveness of that candidate mapping to the query) for the candidate mapping 529, the identifier for that product in the product information data system 530, the date that the record for that part was created in the product information system 531, and a checkbox 532 to allow a user to choose one of the mappings as the final mapping for that request.

Regarding qualification of results, in addition to the qualification described with reference to FIG. 2, embodiments of the technology can perform one or both of filtering and score modification based on classifications and other sources. In filtering, the results can be restricted to product information having classifications matching the classifications used in the query ("actioned" classifications), or to qualifications found during the classification process and not used in the query. In score modification, the score of an individual candidate mapping can by modified (e.g., increased for those products with actioned classifications, decreased for those products without actioned classifications). For example, if the IsAccessory classifier predicted that the client's product ("1200 mAh battery for Casio Exilim camera") was an accessory but the full text engine returned a non-accessory (the camera itself) then the technology can change the camera's qualification.

Further regarding qualifications, the rules used for qualification can be a function of various factors including manufacturer, product line, product model, OEM part number, UPC, field in which information was found, and category match (in part as described above).

One outcome of the rules is that a top candidate mapping can be committed as the final mapping if the qualification for that mapping meets certain criteria. Such criteria can be tailored to the situation and preferences of particular clients, particular categories, and other particular aspects of the part.

The technology can take the form of an entirely hardware embodiment, an entirely software embodiment or an embodiment containing both hardware and software elements and modules. In one embodiment, the technology is implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing program code and for executing program code will include at least one processor, e.g., processor resources, coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for mapping product identification data to product information contained in a product information database, the product information database further comprising product classifications, the method comprising:
   receiving product identification data;
   predicting at least one first classification of the product identification data;
   generating a query based on a subset of the received product identification data and at least one predicted first classification;
   searching the product information database using the query;
   qualifying one or more results of the query at least in part using the at least one predicted first classification;
   determining a mapping prediction for each of the one or more results of the query, the mapping prediction including a first label and a first probability,
      the first label including a proposition that the product identification data indicates a product that is out of scope of the product information database,
      the first probability including a likelihood that the proposition is true;
   if the first probability exceeds a first uncertainty threshold, identifying a product associated with the received product identification data as out of scope of the product information database; and
   mapping the received product identification data to a result qualifying at or above a qualification threshold.

2. The method of claim 1, wherein predicting at least one first classification of the product identification data comprises:
   determining a plurality of predictions, each prediction including
      a second label and a second probability,
      the second label including a proposition regarding classification of the received product identification data,
      the second probability including the likelihood that the proposition is true; and
   for the highest second probability exceeding a second uncertainty threshold, predicting the classification associated with the proposition.

3. The method of claim 2, wherein the uncertainty threshold is determined based at least in part on a ratio of the highest first probability and the second highest first probability.

4. The method of claim 1, wherein the at least one first classification of the product identification data includes at least one of:
   a category classification of the product identification data,
   an accessory classification of the product identification data,
   a pack classification of the product identification data, or
   a third party classification of the product identification data.

5. The method of claim 1, wherein qualifying the results of the query comprises determining an extent to which product identification data is found in the results of the query.

6. The method of claim 1 further comprising presenting the received product information and the one or more results of the query for resolution by a user if the one or more results do not qualify at or above the qualification threshold.

7. A non-transitory computer readable medium that stores instructions for mapping product identification data to product information contained in a product information database, the product information database further comprising product classifications, the instructions being executable by one or more processors to perform steps comprising:
   receiving product identification data;
   predicting at least one first classification of the product identification data;
   generating a query based on a subset of the received product identification data and at least one predicted first classification;
   searching the product information database using the query;
   qualifying one or more results of the query at least in part using the at least one predicted first classification; and
   determining a mapping prediction for each of the one or more results of the query, the mapping prediction including a first label and a first probability,
      the first label including a proposition that the product identification data indicates a product that is out of scope of the product information database,
      the first probability including a likelihood that the proposition is true;
   if the first probability exceeds a first uncertainty threshold, identifying a product associated with the received product identification data as out of scope of the product information database; and
   mapping the received product identification data to a result qualifying at or above a qualification threshold.

8. The non-transitory computer readable medium of claim 7, wherein the instructions for predicting at least one first classification of the product identification data include instructions for:
   determining a plurality of predictions, each prediction including
      a second label and a second probability,
      the second label including a proposition regarding classification of the received product identification data,
      the second probability including the likelihood that the proposition is true; and
   for the highest probability exceeding a second uncertainty threshold, predicting the classification associated with the proposition.

9. The non-transitory computer readable medium of claim 8, wherein the uncertainty threshold is determined at least in part on a ratio of the highest second probability and the second highest second probability.

10. The non-transitory computer readable medium of claim 7, wherein the at least one first classification of the product identification data includes at least one of:

a category classification of the product identification data,
an accessory classification of the product identification data,
a pack classification of the product identification data, or
a third party classification of the product identification data.

11. The non-transitory computer readable medium of claim 7, wherein the instructions for qualifying the results of the query include instructions for determining an extent to which product identification data is found in the results of the query.

12. The non-transitory computer readable medium of claim 7 further comprising instructions for presenting the received product information and the one or more results of the query for resolution by a user if the one or more results do not qualify at or above the qualification threshold.

13. A system for mapping product identification data to product information, the system comprising:
   a product information database including a plurality of product classifications; and
   at least one tangible computer readable medium storing instructions-executable by a processor to perform operations that include:
      receive product identification data;
      predict at least one first classification of the product identification data;
      generate a query based on a subset of the received product identification data and at least one predicted first classification;
      search the product information database using the query;
      qualify one or more results of the query at least in part using the at least one predicted first classification;
      determine a mapping prediction for each of the one or more results of the query, the mapping prediction including a first label and a first probability,
         the first label including a proposition that the product identification data indicates a product that is out of scope of the product information database,
         the first probability including a likelihood that the proposition is true;
      if the first probability exceeds a first uncertainty threshold, identify a product associated with the received product identification data as out of scope of the product information database; and
      map the received product identification data to a result qualifying at or above a qualification threshold.

14. The system of claim 13, wherein the processor is configured to predict the at least one first classification of the product identification data by:
   determining a plurality of predictions, each prediction including a second label and a second probability,
      the second label including a proposition regarding classification of the received product identification data,
      the second probability including the likelihood that the proposition is true; and
   for the highest probability exceeding a second uncertainty threshold, predicting the classification associated with the proposition.

15. The system of claim 14, wherein the uncertainty threshold is determined at least in part on a ratio of the highest first probability and the second highest first probability.

16. The system of claim 13, wherein the at least one first classification of the product identification data includes at least one of:
   a category classification of the product identification data,
   an accessory classification of the product identification data,
   a pack classification of the product identification data, or
   a third party classification of the product identification data.

17. The system of claim 13, wherein the processor is further configured to determine an extent to which product identification data is found in the results of the query.

18. The system of claim 13 wherein the processor is further configured to present the received product information and the one or more results of the query for resolution by a user if the one or more results do not qualify at or above the qualification threshold.

* * * * *